(12) United States Patent
Nguyen et al.

(10) Patent No.: US 7,468,611 B2
(45) Date of Patent: Dec. 23, 2008

(54) CONTINUOUS LINEAR SCANNING OF LARGE FLAT PANEL MEDIA

(75) Inventors: Kent Nguyen, San Jose, CA (US); Eric Thompson, San Jose, CA (US); Hai Tran, San Jose, CA (US); Kaushal Gangakhedkar, San Jose, CA (US); Robert Barnett, San Jose, CA (US); Daniel Toet, Santa Clara, CA (US); David Baldwin, Atascadero, CA (US); Steve Aochi, Morgan Hill, CA (US); Neil Nguyen, Milpitas, CA (US)

(73) Assignee: Photon Dynamics, Inc., San Jose, CA (US)

( * ) Notice: Subject to any disclaimer, the term of this patent is extended or adjusted under 35 U.S.C. 154(b) by 0 days.

(21) Appl. No.: 11/875,655

(22) Filed: Oct. 19, 2007

(65) Prior Publication Data

US 2008/0094081 A1    Apr. 24, 2008

Related U.S. Application Data

(60) Provisional application No. 60/862,427, filed on Oct. 20, 2006.

(51) Int. Cl.
*G01R 31/00* (2006.01)
*G01R 31/02* (2006.01)

(52) U.S. Cl. .................... 324/754; 324/770; 324/158.1

(58) Field of Classification Search ................. None
See application file for complete search history.

(56) References Cited

U.S. PATENT DOCUMENTS

| 4,870,357 | A | * | 9/1989 | Young et al. ............... 324/770 |
| 5,717,780 | A | * | 2/1998 | Mitsumune et al. ......... 382/141 |
| 2004/0100299 | A1 | * | 5/2004 | Murakawa et al. .......... 324/770 |

FOREIGN PATENT DOCUMENTS

| FR | 2592958 A1 | * | 7/1987 |
| JP | 59027379 A | * | 2/1984 |

* cited by examiner

*Primary Examiner*—Paresh Patel
(74) *Attorney, Agent, or Firm*—Townsend and Townsend and Crew LLP

(57) ABSTRACT

A system performs continuous full linear scan of a flat media. The system includes, in part, a chuck, and at least first, second and third gantries. The chuck is adapted to support the flat media during the test. The first gantry includes at least one linear array of non-contacting sensors that spans the width of the flat media and is adapted to move across an entire length of the flat media. Each of the second and third gantries includes a probe head that spans the width of the flat media and each is adapted to apply an electrical signal to the flat media. Each probe head is further adapted to move along a direction substantially perpendicular to the surface of the flat media during the times when the first gantry is in motion and while test signals are being continuously applied.

22 Claims, 13 Drawing Sheets

CONTINUOUS LINEAR SCANNING OF LARGE FLAT PANEL MEDIA

CROSS-REFERENCES TO RELATED APPLICATIONS

The present application claims benefit under 35 USC 119 (e) of the following, commonly assigned, U.S. provisional Application No. 60/862,427, filed Oct. 20, 2006, entitled "Continuous Linear Scanning Of Large Flat Panel Media", the content of which is incorporated herein by reference in its entirety:

The present application is related to commonly assigned U.S. application Ser. No. 11/379,413, entitled "Direct Detect Sensor For Flat Panel Displays", filed Apr. 20, 2006, the content of which is incorporated herein by reference in its entirety.

The present application is related to commonly assigned U.S. application Ser. No. 11/389,556, entitled "Vacuum Gripping System for Positioning Large Thin Substrates On a Support Table", filed Mar. 23, 2006, the content of which is incorporated herein by reference in its entirety.

The present application is related to commonly assigned U.S. application Ser. No. 11/486,206, entitled "Substrate Alignment Using Linear Array Sensor", filed Aug. 29, 2006, the content of which is incorporated herein by reference in its entirety.

BACKGROUND OF THE INVENTION

In a finished liquid crystal flat panel, a thin layer of liquid crystal (LC) material is disposed between two plates of glass. On one plate of glass, one or more two-dimensional arrays of electrodes are patterned, each array referred to as a panel. Each electrode may be on the order of 100 microns in size and can have a unique voltage applied to it via multiplexing transistors positioned along the edge of the panel. In a finished product, the electric field created by each individual electrode couples into the LC material and modulates the amount of transmitted light in that pixilated region. This effect when taken in aggregate across the entire two dimensional array results in a visible image on the flat-panel.

A significant part of the manufacturing cost associated with liquid crystal display (LCD) panels occurs when the LC material is injected between the upper and lower glass plates. It is therefore important to identify and correct any image quality problems prior to this manufacturing step. The problem with inspecting LCD panels prior to deposition of the liquid crystal material is that without LC material, there is no visible image available to inspect. Prior to deposition of LC material, the only signal present at a given pixel is the electric field generated by the voltage on that pixel.

To overcome this limitation, Photon Dynamics has developed a floating modulator which, in part, includes a relatively large piece of optically flat glass with a thin layer of LC material formed on its surface, as shown in FIG. 1A. To inspect the patterned glass plate 10, modulator 15 whose dimensions are smaller than those of the flat panel, is physically moved over a portion of the panel to be inspected and then lowered to within a few microns of the flat panel's surface, as shown in FIG. 1B. A drive signal is applied to the electrodes on the panel. The small air gap 25, typically 10 to 50 micrometers, between the flat-panel electrodes 30 and the LC modulator 15 allows the electric field from each pixel electrode 30 on the patterned glass plate 10 to couple to modulator 15 to create a temporary visible display of the panel. This visible display is subsequently captured by camera 35 for identification of defects. After inspecting a region, modulator 15 is lifted and moved to another region on the panel and the process is repeated. Through this step-and-repeat process, the entire LC panel can be inspected for defects. In FIGS. 1A and 1B, LC modulator 15 is shown as including an LC material 45 and a flat glass 50.

Inspecting an LCD panel at high speeds using the modulator described above poses technical challenges. For example, when inspection at one site is completed, the modulator, which may weigh several pounds and which also lies very close to the panel during inspection, is first lifted to ensure that the modulator does not damage the glass panel, and then moved to the next site and lowered towards the panel for the next inspection operation. These movements plus any time required to allow settling of the movements impacts the system throughput. Presently known step-and-settle modulators do not readily lend themselves to continuous linear scanning, which may provide far higher system throughput, primarily because of their form factor which is far smaller than the large substrates.

With the modulator described above, the visible image of the thin LCD layer is obtained by reflecting light from the surface of the LC material. The LC material acts a scattering medium in its off-state and a transmissive medium in the on-state. This typically results in the generation of a DC-component of light modulated with a relatively small amount of information. To the camera 35, this means that the imager must be able to handle a relatively large signal (for the DC component) even though the signal containing the information is relatively weak. Furthermore, the relatively large DC-component of light component may carry a correspondingly large amount of shot noise which needs to be overcome to enable one to reproduce the flat panel defect data.

Another method of panel testing uses an electron beam and imaging apparatus to detect defects. Typical electron beam testers include several electron beam/imaging heads that step along the panel surface and requires that a drive signal is applied to the panels, as are found in the electro-optical modulator based tester. However, since the electron beam heads can be smaller in size, several electron beam heads may span across the width of a panel, and thus the amount of side-ways stepping can be less in the electron beam tool than a modulator-based tool. An electron beam based tool requires vacuum, and the electron beam sensor heads cannot fully span the width of a flat panel.

BRIEF SUMMARY OF THE INVENTION

In accordance with the present invention, a continuous linear scanning system is adapted to handle, support, transport, position and constrain relatively large and generally flat and thin objects to perform test or inspection. More specifically, the present invention provides apparatus and methods that use one or more linear arrays of non-contacting sensors for electrical functional inspection, or automated optical inspection (AOI) or metrology of large flat, flexible and/or patterned media, such as glass panels deposited with structures used to form thin film transistor (TFT) arrays, that form the components of liquid crystal flat panel displays (LCD). The present invention is applicable to high throughput, in-line testing of plates of TFT/LCD panels, OLED-based TFT panels, solar cell panels at various stages of production, and any other flat media.

In accordance with one embodiment of the present invention, a system adapted to perform a continuous full linear scan of a flat media having a plurality of pixels, includes, in part, a chuck, and at least first, second and third gantries. The chuck is adapted to support the flat media during the test. The first gantry includes at least one linear array of non-contacting sensors that spans the width of the flat media and is adapted to move across an entire length of the flat media. The second gantry includes a probe head that spans the width of the flat media and is adapted to apply an electrical signal to the flat media. This probe head is further adapted to move along a direction substantially perpendicular to the surface of the flat media during the times when the first gantry is in motion. The third gantry also includes a probe head that spans the width of the flat media and that is adapted to apply an electrical signal to the flat media. This probe head is further adapted to move along the direction substantially perpendicular to the surface of the flat media during the time when the first gantry is in motion.

In one embodiment, the system further includes at least one actuator and a feedback control circuit that operations in communication with the actuator to maintain the distance between the linear array of non-contacting sensors and the flat media to within a predefined range. In one embodiment, the at least one actuator includes a pneumatic actuator. In another embodiment, the at least one actuator includes a pneumatic actuator and a voice coil. In yet another embodiment, the at least one actuator includes a pneumatic actuator and a piezo electric actuator.

In one embodiment, the feedback control circuit is integrated with the linear array of non-contacting sensors. In one embodiment, the system further comprises a control circuit that controls the movements of the first and second gantries so as to enable continuous scanning of the flat media while power is applied to the flat media.

In one embodiment, the linear array of sensors is formed from an assembly of linear sensors that are coupled and aligned to one another to span the full width of the flat media. In another embodiment, the first gantry further includes a second linear array of non-contacting sensors that span the width of the flat media. In such embodiments, the second linear array of non-contacting sensors may also be formed from an assembly of linear sensors coupled and aligned to one another so as to span the full width of the flat media.

In one embodiment, the system further includes, in part, first and second cylinders. The first cylinder is adapted to move a multitude of probes positioned on the first probe head into and out of contacts with a multitude of pads positioned on the flat media. The second cylinder whose strokes are greater than those of the first cylinder is adapted to move the first probe head to a level below a top surface of the chuck.

BRIEF DESCRIPTION OF THE DRAWINGS

FIGS. 5A-5C show various views of a chuck using rectangular tiles.

DETAILED DESCRIPTION OF THE INVENTION

In accordance with the present invention, relatively large and generally flat and thin flexible objects or media are handled, supported, transported, positioned and constrained with relatively high mechanical precision using continuous linear scanning. More specifically, the present invention provides apparatus and methods for transport and constraint using a linear sensor, such as the linear sensor described in U.S. application Ser. No. 11/379,413, for electrical functional inspection, or automated optical inspection (AOI) or metrology of large flat, flexible and/or patterned media, such as glass panels deposited with structures used to form thin film transistor (TFT) arrays, that form the components of liquid crystal flat panel displays (LCD). The present invention is applicable to high throughput, in-line testing of plates of TFT/LCD panels, OLED-based TFT panels, solar cell panels at various stages of production, and any other flat media.

Scanning systems require a linear sensor (or detector) assembly that spans fully across one dimension of the flat panel medium. Then, the linear sensor (or detector) is scanned, or moved, in the second dimension. It is possible to move the panel relative to the linear sensor, or move the linear sensor relative to the panel. For the case of very large thin panels, such as flat panel display panels which may be as large as three meters by three meters and less than a millimeter in thickness, it is more cost effective to move the sensor relative to the panel.

Non-contact capacitive coupling techniques have been developed to test LCD flat panel arrays. U.S. application Ser. No. 11/379,413 discloses a linear capacitive sensor that may be used in flat panel testing, for example. In one embodiment described in this application, a linear array of sensors that can fully span one dimension of a flat panel is brought in proximity (e.g., 10 microns to 100 microns) to the flat panel under test, which is then energized with an electric signal, and the electric field generated by the panel electrodes is capacitively measured. A scanning rate of about 100 millimeters per second or about 100 microns per millisecond may be used. Such linear sensors require suitable methods and apparatus for handling the large flat panels.

Figure 2:
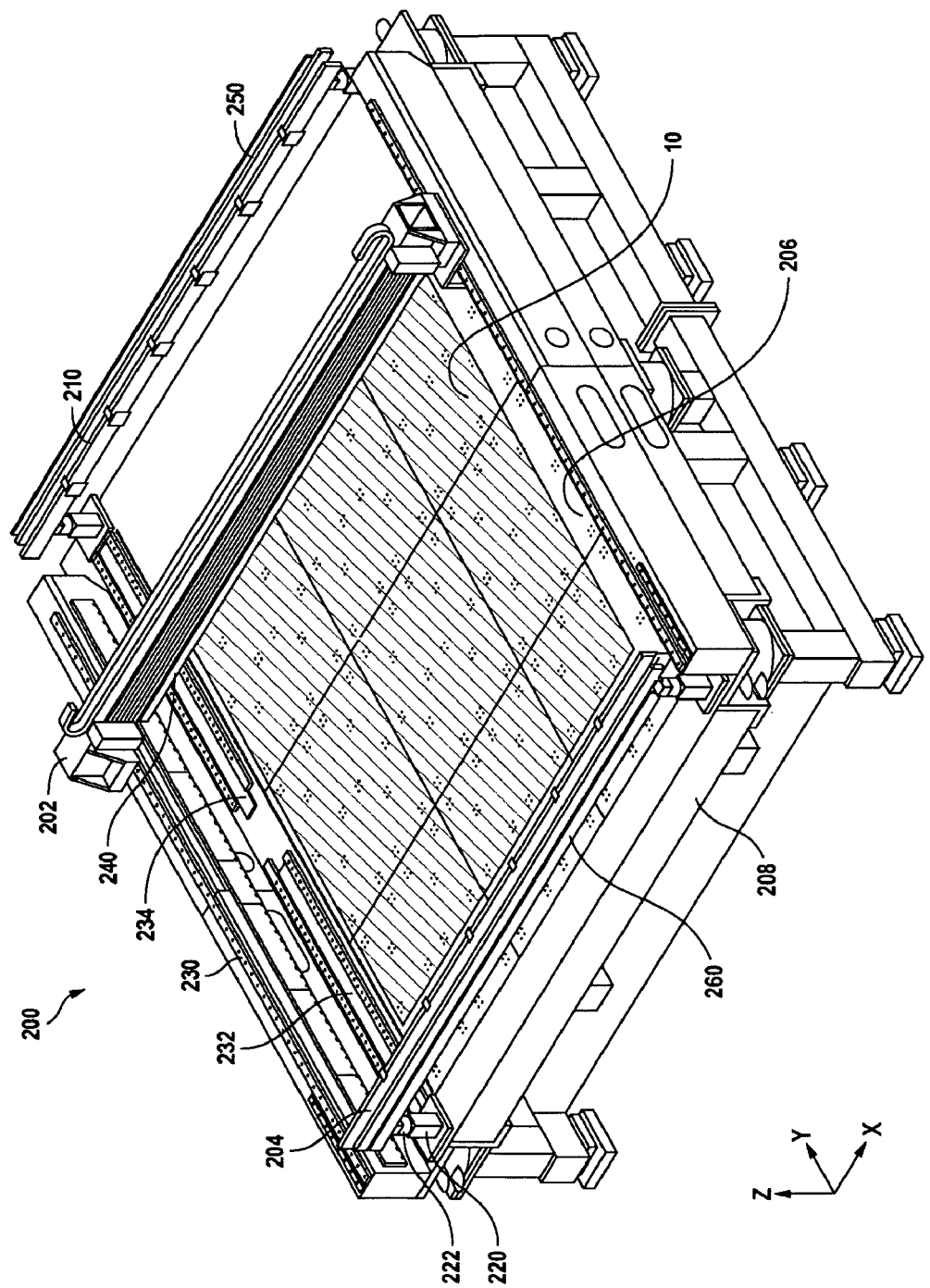
FIG. 2 shows a system with a continuous linear scanning for testing a panel, in accordance with one embodiment of the present invention.

FIG. 2 shows a system 200 that includes, in part, a non-contacting linear sensor 240, adapted to scan a large flat panel or media (hereinafter alternatively referred to as panel) 10. Flat panel 10 is placed on a chuck surface 206 that is part of platform 208. Linear sensor 240 is mounted on a gantry 202, and spans the full width of the panel along the X direction. Gantry 202 is adapted to move across the full length of the panel along the Y direction without contacting the panel. In accordance with aspects of the present invention, the gap (distance) between the linear sensor 240 and panel 10 is maintained within a predefined range established to meet various requirements, such as, depth of field in the case of imaging, or sensitivity in the case of capacitive testing. This requires (i) control of the flatness specification of the large panel, and therefore the flat surface (or chuck) on which it rests, and also of the stability of a flight control mechanism that maintains the gap between the sensor and panel; (ii) the ability for the sensor to view the entire surface area of the panel; (iii) the ability to apply an electrical driving source through probe bars 250, 260 during testing, in the case of an electrical test tool, in such a way to probe without interrupting the scan; (iv) an architecture and sequencing of steps that minimizes time from first panel load through completion of test to second panel load (tact time); the ability to align the pattern on the panel relative to the movement of the sensor; and the ability to find the position of a reference mark on the panel relative to the stage position.

Figure 3A:
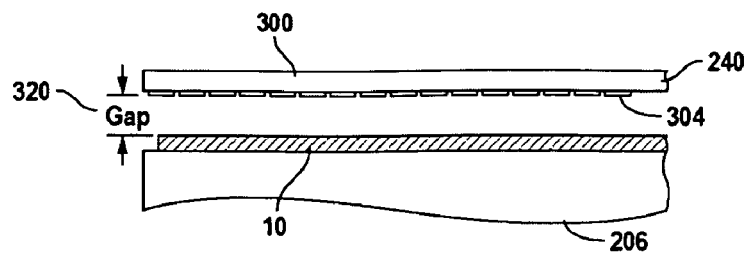
FIG. 3A is a side view a linear scan sensor, in accordance with one embodiment of the present invention.
Figure 3B:
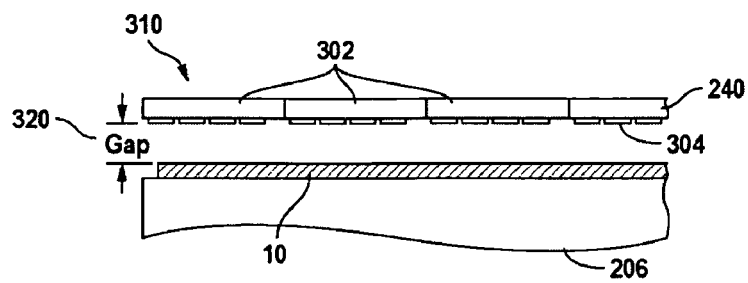
FIG. 3B is a side view a linear scan sensor, in accordance with another embodiment of the present invention.
Figure 3C:
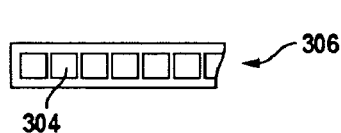
FIG. 3C is a side view of linear sensor array that includes a single line array of sensors, in accordance with one embodiment of the present invention.
Figure 3D:
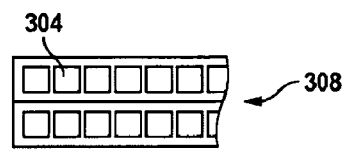
FIG. 3D is a side view of linear sensor array that includes a number of line arrays forming a two-dimensional array of sensors, in accordance with another embodiment of the present invention.

FIGS. 3A and 3B are side views of linear sensor array 240 of FIG. 2A. The embodiment of the linear array of sensors shown in FIG. 3A spans the full width of the system 200 of FIG. 2. The embodiment of the linear sensor array shown in FIG. 3B includes an assembly of linear sensors 302 that are each shorter than the full width of the system and are joined and aligned to span the full width of system 200. Each linear sensor 302 is shown as including a multitude of sensors 304. In one embodiment, the linear sensor array includes a single line array 306 of sensors 304, as shown in FIG. 3C. In another embodiment, as shown in FIG. 3D, the linear sensor array includes a number of line arrays that form a two-dimensional array 308 with one dimension spanning the full width of the system. The linear sensors are typically non-contacting, and may be capacitive or optical, or a combination of these functions. For a continuous linear scan system, linear array may include M lines of single line arrays whether segmented or one piece, where M is greater than or equal to one, but where M is much less than the number N of sensors spanning the width of the system. Often M is more than one to enable redundancy of the linear sensors.

Figure 1A:
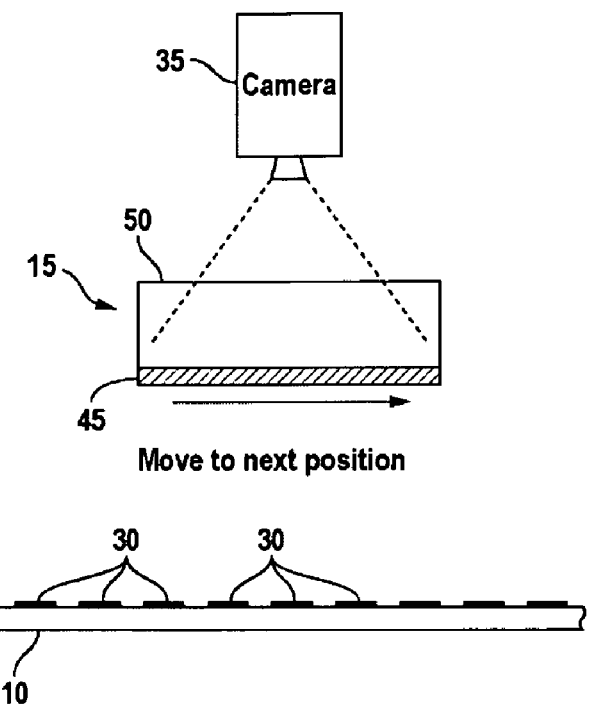
FIG. 1A shows a floating modulator positioned above a patterned glass plate, as known in the prior art.
Figure 1B:
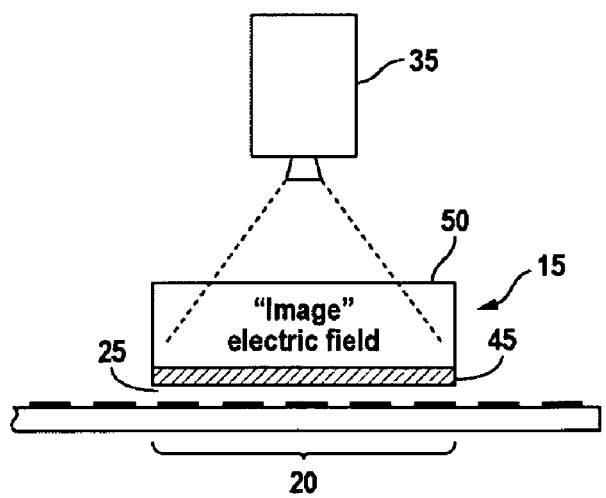
FIG. 1B shows the floating modulator of FIG. 1A positioned in proximity of the patterned glass plate to perform testing, as known in the prior art.
Figure 1C:
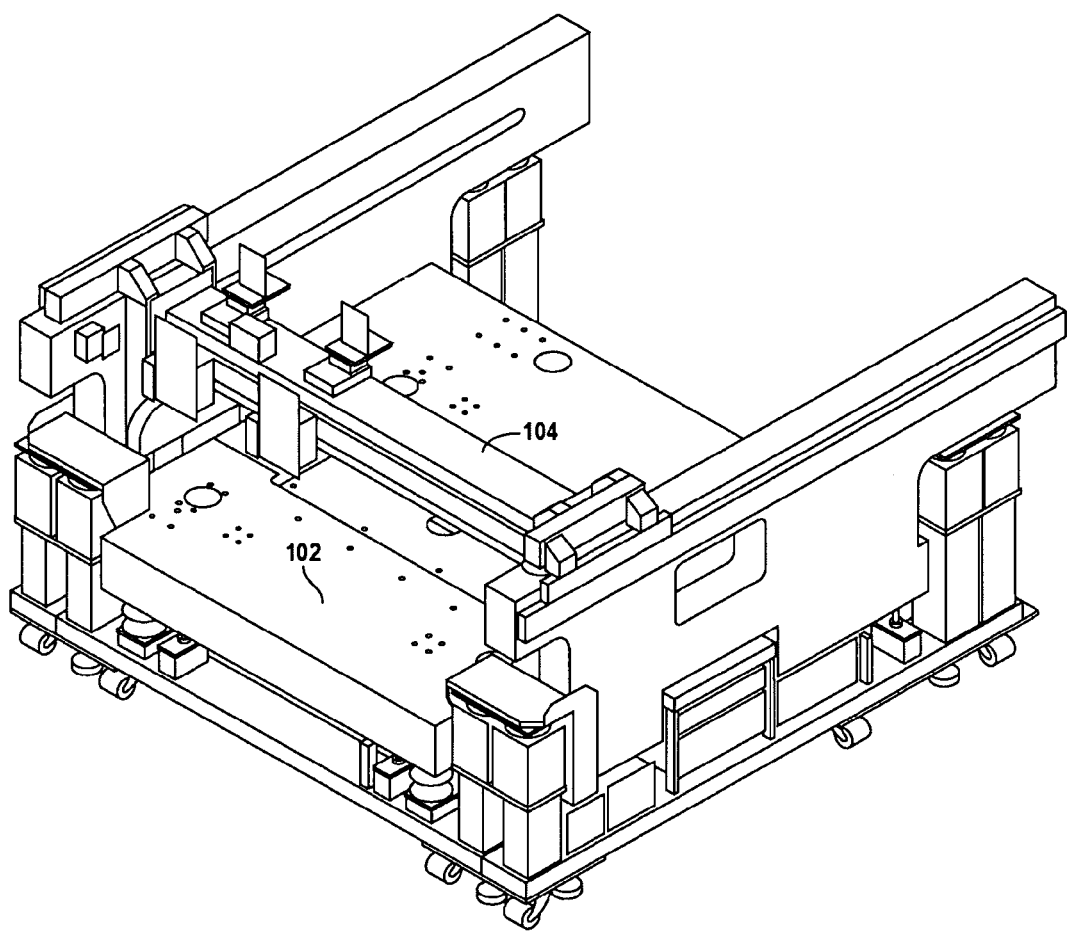
FIG. 1C shows a prior art system for electrically testing flat panels.

For applications requiring high mechanical precision, a system such as that shown in FIG. 1C, that includes a massive base plate 102 and stiff gantry 104, provides a precision reference frame with high stiffness and flatness. To keep stiffness over a large area, materials such as granite, polymer casting, steel, or carbon fiber are used for the base plate and gantry. A vacuum chuck holds the flexible media to be inspected and provides the flatness reference for the thin substrate. Prior art gantry stages such as shown in FIG. 1C are typically relatively far larger than the flat panel size to enable full coverage of the panel and enable enough travel stroke for the stage controller and mechanisms. For example, a prior art gantry stage for Generation 6 size flat panels, which are approximately 1500 mm by 1850 mm, may have overall dimensions 2920 mm wide by 3050 mm long and may weight up to 11 tons. However, in the primary application domain of interest, the testing of TFT/LCD glass plates, the size of the glass plates has increased as the industry strives for larger and thinner glass, and therefore, the size of the tools to test or inspect these very large plates has also increased. Generation 10 flat panels, for example, are approximately 3 meters on a side, and would drive the footprint of an scaled-up version of the prior art step-and-settle voltage imaging optical system to as large as 4 meters or more on a side.

Referring to FIG. 3A-3D, for highest consistency and accuracy, a controlled distance 320 is required between the full surface of sample 10 and non-contacting image sensors or capacitive sensors 304 of the linear sensors 300 or 302. The tolerance in this distance is, for example, ±1.5 μm for a typical high resolution system with 0.5 μm object plane resolution, and these levels of resolution further impose high accuracy and repeatability in z-axis positioning and high rotational stiffness around the x and y-axes. For the capacitive sensor described in U.S. application Ser. No. 11/379,413, a typical operating gap is 20 to 100 micrometers, which must be maintained within ±2 micrometers.

Often, a chuck 206 shown in FIG. 2 provides a stiff reference plane for the flat panel. In one embodiment, the chuck must have flatness requirements of, for example, 50 microns or better overall and maximum slope of 2.5 microns over a span of 25 mm. Generally, the glass panels are moved onto the chuck by a factory robot arm. An air cushion between the chuck and the glass plate is established by blowing air through the chuck surface. The glass is floated on the air cushion, then aligned using mechanical devices such as grippers or scrubbers. Then once aligned, the air is turned off and vacuum is applied to clamp the glass in place for processing. Because the glass is relatively thin, the chuck surface is effectively the reference to which the linear sensor is aligned. Any chuck surface anomalies that may cause the chuck surface to exceed the maximum slope of 2.5 microns over 25 mm, for example caused by uneven lapping of the chuck surface or physical distortion (warpage or sag) of the chuck or unevenness at seams between tiles in the case of multi-tiled chucks, will be transferred directly to the glass non-flatness.

For glass substrates of Generation 5 size (1200 mm by 1300 mm) and smaller, it is possible to make single piece vacuum chucks that meet flatness requirements. For Generation 6 glass, multi-piece vacuum chucks have been developed, where the individual pieces are pre-lapped, glued and bolted together. The seams between the top plates are then precisely aligned or hand lapped, and inspected so as to meet the slope flatness requirements.

Larger glass substrates (greater than about 1870 mm) require chuck sizes in whole or in pieces that demand capabilities beyond what can practically be machined, ground, lapped and inspected. Large vacuum chucks may be made from smaller manageable and more manufacturable tiles that are able to meet stringent flatness requirements for the flat panel industry. Tiles may be separated and then individually leveled using at least three kinematic mounts. The key is to achieve flatness within specification across all the tiles and especially across seams. Each tile is lapped and is measured for flatness when the tile is resting on three points. To achieve the required stiffness at reasonable cost, tradeoffs must be made among material type, shape, size and thickness of the chuck tile.

Materials for chucks may include anodized aluminum, ceramics, glass and metals. Requirements for an electrical insulating chuck and general stiffness requirements and the possibility of electromagnetic interference with test methods typically limit the use of metal chucks. Alumina is a typical ceramic offering good coefficient of thermal expansion, good stiffness, and ability to be lapped very flat.

Figure 4:
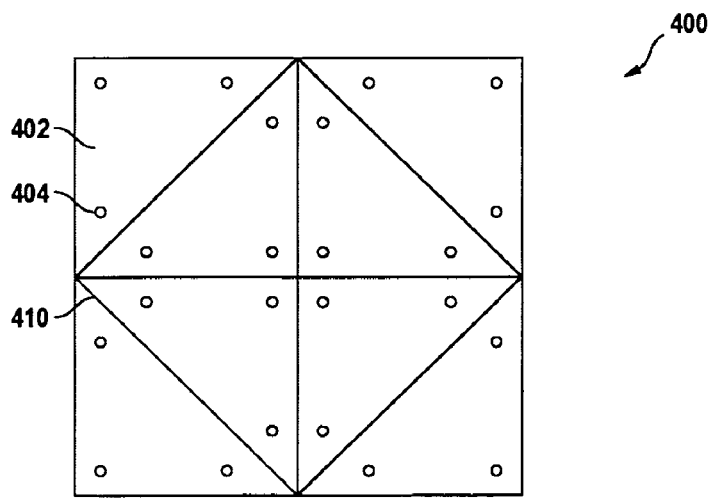
FIG. 4 shows a layout of chuck using triangular tiles.
Figure 5A:
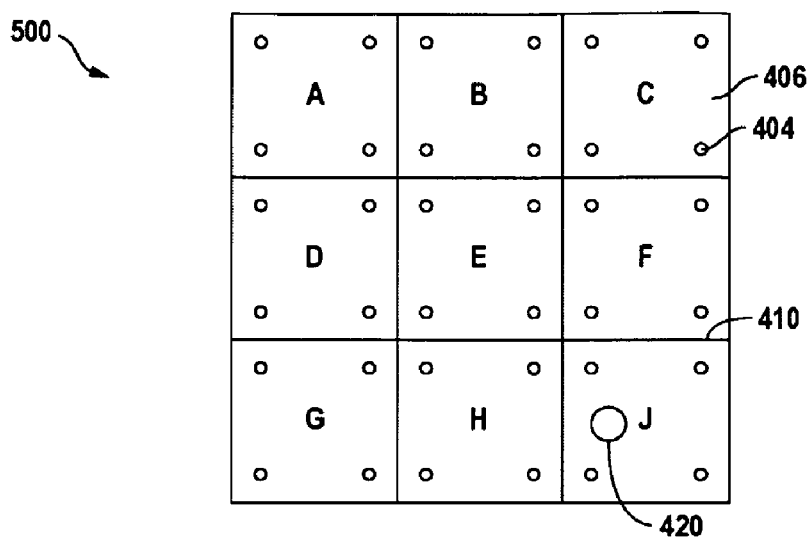

Tiles may be rectangular or triangular, for example, as shown in FIGS. 4 and 5A. Rectangular shapes 406, shown in FIG. 5, offer the advantage of matching the panel shape with smallest number of tiles. However, if a tile is too large (for example greater than approximately 750 mm), the three kinematic mounting points 404 will not be sufficient to overcome sagging of the plate due to gravity. Large rectangular plates may require jacks or stiffeners at the four corners. Alternatively, a triangular plate 402, as shown in FIG. 4, may be used, having the advantage of maintaining flatness by the three kinematic mounts without additional stiffeners. Other embodiments may be employed which distribute functionality of the kinematic mounts. For example, a reference base plate may be provided between the chucking surface plate and may be vertically adjusted, while adjustment mechanisms between the chuck and base plate may adjust planarity only.

Another challenge is ensuring that the seam 410 between two neighboring tiles meets the slope flatness requirement. One tile shape does not have particular advantages over another in regards to seam matching. All of the edges of a tile that butt against other tiles edges must result in a smooth (level) seam. Each tile may be fabricated by first coarsely shaping, followed by fine grinding to final dimensions and within 1 um flatness, then sand blasting the top surface pattern, and lastly, lapping the top surface. The step creating the surface pattern may change the flatness from one micrometer to as much as 25 micrometer over a one meter plate. Because lapping is typically a manual process, convex or concave areas may be formed. The flatness requirements are more difficult to control using tiles of large areas (for example, on the order of one meter by one meter). Further, since each tile may be typically hand-lapped, one tile's lapped contours near the seams will not necessarily match the neighboring tile's lapped contours.

For ease of alignment, it may be desirable to have the fewest possible tiles that make up the total chuck area. A monolith chuck for Generation 10 glass is far too large to fit in standard grinding, lapping, inspection or fabrication machines. Instead multi-piece chucks may be more practical to use. Possible layouts of triangular and rectangular tiles, optimized for minimum number of tiles and for seam lapping/matching, are shown in FIGS. 4 and 5A. For inspection and lapping, an odd number of rectangles may be used in one embodiment in order to allow a sequence of lapping by groups of tiles such as ABDE, BCEF, EFHJ, and DEGH, as illustrated in FIG. 5A. Such grouping of the lapping sequence can result in overlapping coverage of the full surface, and thus a more uniform surface across seams.

Adoption of an approach minimizing the number of tiles means that that the tiles may be relatively large and therefore it may be more difficult to maintain flatness due to difficulty in managing the contour variations from tile to tile. Once lapping is completed, the tiles become a matched set, and if any one tile breaks, the entire matched set will need to be replaced.

An alternative approach is to optimize based on the largest tile size that can be fabricated within the required tight flatness specification but also within reasonable cost. Such a tile size optimized for flatness is likely to be smaller than tile sizes optimized for minimum number. Adoption of this approach can mitigate the requirement for a matched set. For example, chucks for processing 300 mm semiconductor wafers have been fabricated within reasonable cost to very tight flatness specifications, such as 0.3 microns (equal to ½ wavelength of helium laser line of 632 nm). For this case, to maintain the same slope flatness of 2.5 microns over 25 mm between tiles, the 300 mm tiles may be separated from each other by no more than 6 mm. Thus, a chuck for Generation 10 sized flat panels may include over 100 alumina ceramic tiles, each approximately 300 mm by 300 mm by 25 mm thick in size and each with tightly controlled flatness. The approach of using many smaller tiles each with tighter flatness specification relieves the matching constraint, but places some burden on the time required to align the large number of tiles.

Irrespective of how many pieces or types of materials are used to form the chuck, all chucks must include certain features to maneuver and align the glass within the continuous scan system, and to accept and handoff the glass to the factory robot. To align the glass, through-holes for grippers or side features for scrubbers are generally required. Distribution holes and pathways for air and vacuum are often designed into the chuck as well. To minimize overall surface contact between the flat panel sample and the vacuum chuck, a raised pattern may be formed on the chuck surface through a process such as bead blasting. FIG. 5B is a magnified view of area 420 of tile J of FIG. 5A showing the raised patterns 422. FIG. 5C is a cross-sectional view of area 420 along the axis A-A'. The surface features (for example, through-holes for grippers and air/vacuum paths and passages) may be positioned on the chuck surface to accommodate more than one size of glass substrates. To perform continuous scanning in order to carry out testing, or inspecting, or processing of multiple glass sizes, it is advantageous to front justify the glass substrates so as to minimize the robot arm length or travel distance.

Figure 6:
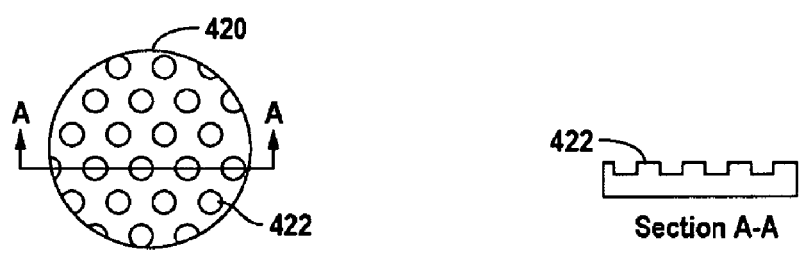
FIG. 6 shows a chuck formed using a number of stiff beams.
Figure 6:
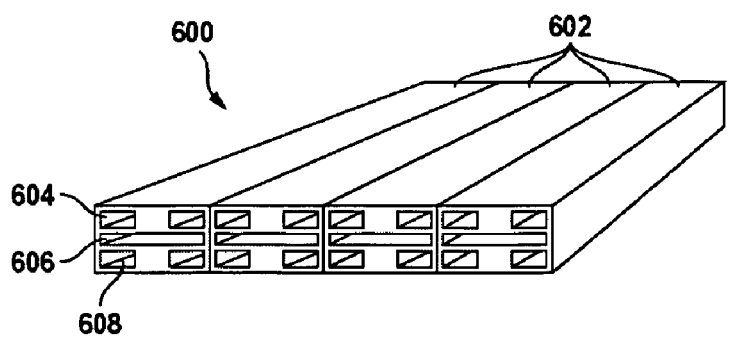

An alternative method to form a large area vacuum chuck is to place long ceramic guide beams side by side. In the example shown in FIG. 6, four long beams 602 are butted together to form a single chuck 600. Seams between the beams may be lapped. Passageways 604, 606, 608 are included for delivery of air and vacuum, as well as to minimize the overall weight of the beams.

As shown in FIG. 3, the non-contacting linear sensor 300 or 302 is adapted to fly over the flat panel 10 at a consistent height 320 relative to the panel's top surface. Conventional gas bearing techniques designed to achieve fly height uniformity have often too slow a response time for maintaining the accurate gap tolerance at the required scan speeds. Thus, in accordance with one embodiment of the present invention, a system and method for controlling the height of the scan sensor above the panel being tested is provided.

Figure 7A:
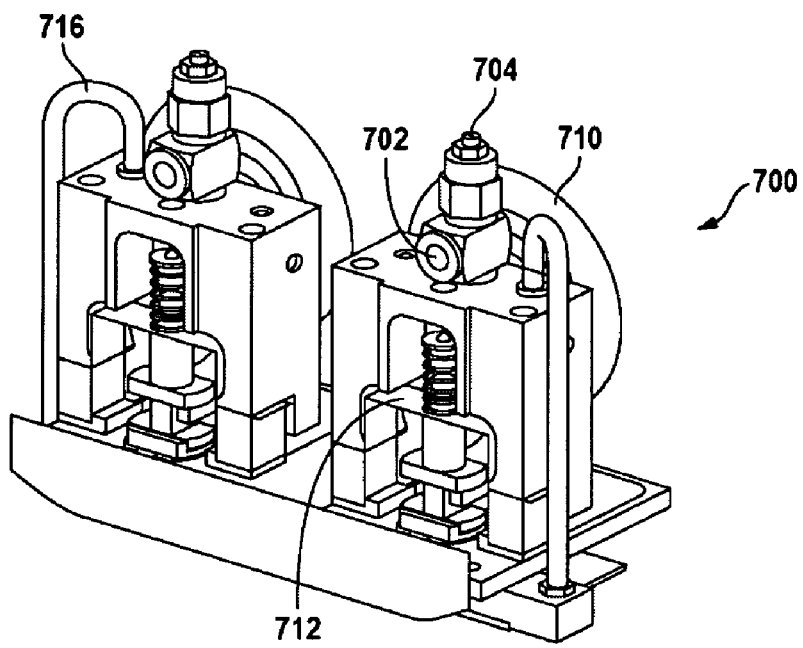
FIGS. 7A and 7B are perspective views of a diaphragm/pneumatic flight control apparatus adapted for use with the continuous linear scan system of FIG. 2, in accordance with one embodiment of the present invention.
Figure 7B:
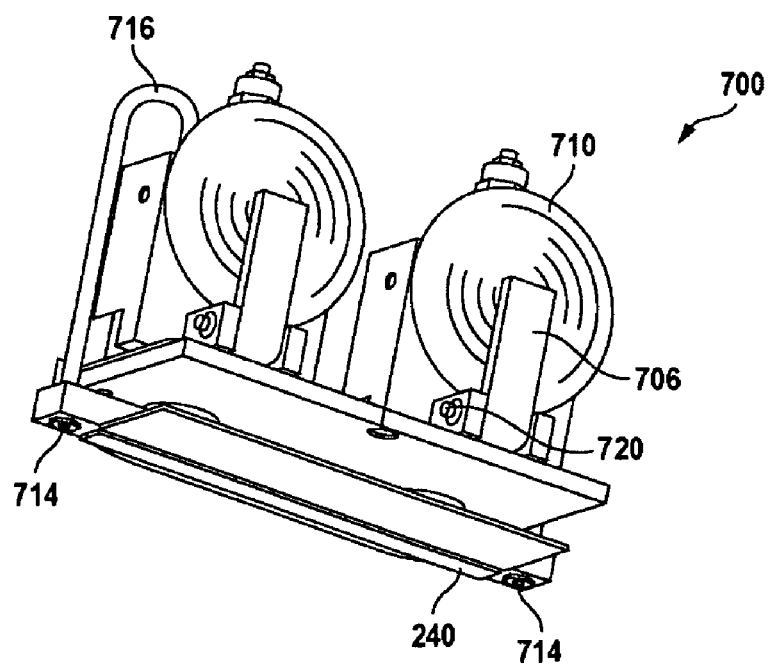
Figure 7C:
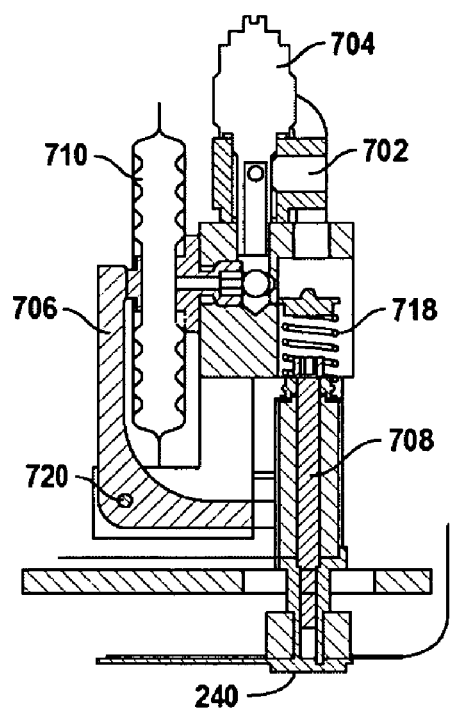
FIG. 7C is a cross-sectional view of the diaphragm/pneumatic flight control apparatus of FIGS. 7A-7B.

FIG. 7A is a perspective front view of a flight control apparatus 700 adapted to control the fly height of a linear scan sensor, in accordance with one embodiment of the present invention. FIG. 7B is a perspective back view of flight control apparatus 700. FIG. 7C is a cross-sectional view of apparatus 700. Referring to FIGS. 7A and 7B concurrently, the linear scan sensor positioning is actuated by compressed air that is supplied to the air inlets 702 of the needle valves 704. The scan sensor 240 is held substantially above the glass plate, for example, several hundred microns, using linkages 706 and flexure support rods 708 whose positions are controlled by pneumatic actuators 710. Flexures 712 ensure that the scan sensor 240 moves only along an axis perpendicular to the panel. Each end of the scan sensor 240 is driven by one of the pneumatic actuators 710 to control the gap height along the scan sensor 240's length. The scan sensor can tilt slightly along its long direction and move away or towards the panel to maintain parallelism with the panel. Linkages 706, driven by pneumatic actuators 710, are attached to each end of the scan sensor and convert the diaphragm movement (lateral as shown in FIG. 7) into a movement of the support rod 708 and sensor 240 in the Z direction to maintain the correct sensor distance and parallelism from the scan sensor to the panel.

Each distance sensor tube 714 is configured so that air pressure and flow from the sensor increases as the sensor is moved closer to the panel. The distance sensor 714 is a simple tube through which air flows. The pressure in the connecting air tube 716 increases as the distance sensor's opening gets closer to the panel surface and restricts the flow of air. The pressure from the distance sensor 714 is transferred to the pneumatic actuator 710 through the connecting air tube 716.

Positioning, or gapping, of the scan sensor is accomplished using pressure that is fed back from the distance sensors 714 through tube 716 to the pneumatic actuators 710. The pneumatic actuator expands when air pressure from the distance sensor increases as it gets closer to the panel, and then pulls the scan sensor away from the panel. A compression preload spring 718 is used to force each end of the scan sensor into the panel. The gapping function is a balance between the compression spring pushing the sensor into the panel and the force of the pneumatic actuator pulling the end of the scan sensor away from the panel. The force per micrometer of movement of the actuator plus distance sensor subsystem is designed to be very high, thus allowing good repeatability as the closed loop system delivers adequate stiffness to overcome hysteresis and friction of the mechanical components.

The gap between the panel and scan sensor is adjusted by changing the inlet pressure to the needle valve 704, thus changing the amount of air that flows through the distance sensor. Alternatively, the needle valve can also be adjusted to change the running gap. The air supply pressure needs to remain constant to within a few pounds per square inch (psi) typically to maintain the gap over time. The response time is limited by the speed of the pressure wave generated by a change in the distance sensor gap. The pressure wave travels at the speed of sound through the connecting tube. The response time can be minimized by keeping the connecting tube short.

A number of linear scan sensors may be required to span the full width of the large flat panel. For example, one embodiment may use forty linear scan sensors 302 to form a linear array 310, as shown in FIG. 3B. Linear scan sensors 302 are calibrated with respect to one another. This is achieved by using, for example, local height/gap sensing on the linear scan sensor assembly, such as that described in U.S. Application No. 60/862,372. With height/gap detectors at the ends of each linear scan sensor assembly and by employing two flight control apparatus per linear scan sensor (as shown in FIGS. 7A-7C), out-of-plane tilt of the sensor may be controlled through measurement by the end height/gap sensors and feedback to the flight control apparatus. In-plane (x, y, rotational) alignment from sensor assembly to sensor assembly may be achieved by embedding a strip of material with a well-defined pattern at the edge of the chuck and then measuring and correcting for any offsets.

Although a pneumatic sensor and actuator can accurately follow the profile of the panel topology, the response time and typical bandwidth of greater than 50 Hz may not be adequate to provide quality images from the linear scan sensor, bandwidth of greater than 100 Hz may be required. The control characteristics of voice coils are well known and a voice coil design can provide the required response and bandwidth to acquire quality data from the linear scan sensor. However, voice coils when de-energized may cause the sensors to fall into the panel. This shortcoming can be overcome by preloading the moving coil to rise upward when in a de-energized state, but then the coil must be powered continuously to offset such a pre-load, thereby injecting undesirable heat into the system. Furthermore, a voice coil is difficult to control when first engaging the panel as there is no known electronic sensor that can guide the voice coil to safely engage the panel.

Figure 8A:
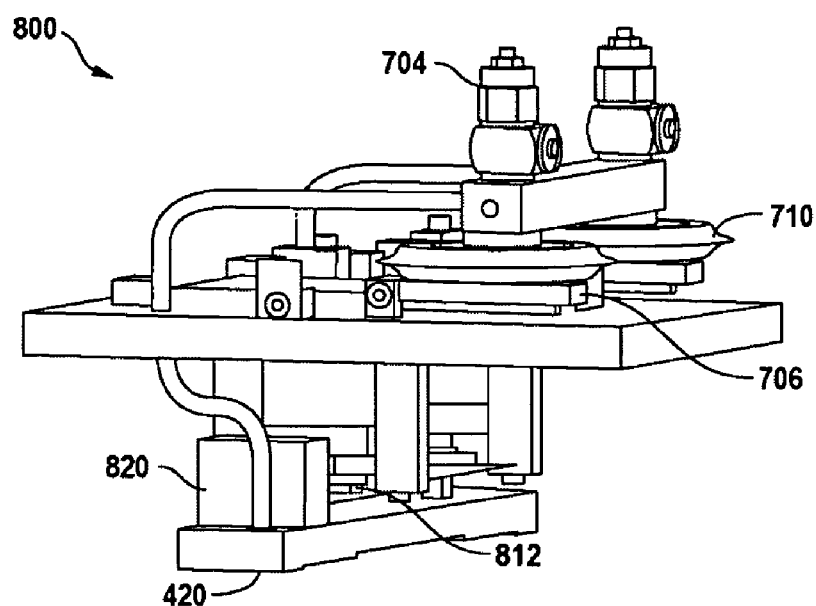
FIGS. 8A and 8B are perspective and cross sectional views of a hybrid pneumatic/voice coil flight control apparatus, in accordance with one embodiment of the present invention.
Figure 8B:
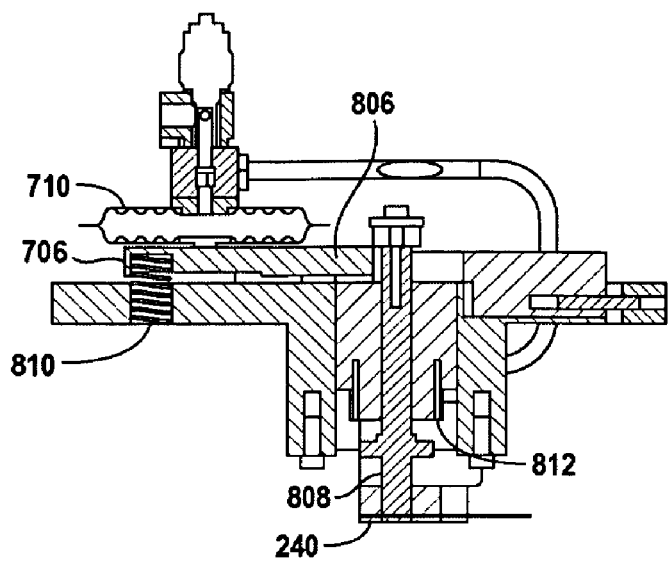

In accordance with one embodiment of the present invention, a flight control apparatus includes a pneumatic sensor and a voice coil. FIGS. 8A and 8B are perspective and cross-sectional views of a flight control apparatus 800, in accordance with one embodiment of the present invention. Flight control apparatus 800 is shown as including pneumatic actuators 710 and a voice coil 812. Pneumatic actuators 710 cause the links 706 to pivot about member 806 and move the sensor mount rods 808 and linear scan sensor 240 in the Z direction. Voice coil 812 surrounds the mount rod 808 in the embodiment shown in FIGS. 8A and 8B. A preload spring 810 may be included. Because the pneumatic sensor/actuator can accurately sense and follow the profile of the panel independent of the panel surface at distances greater than 30 micrometers and provide a stiff platform, the pneumatic sensor/actuator could safely engage a panel at a predetermined set point slightly lower than the fly height of the linear scan sensor. Once the panel is engaged the voice coil activates, and then lifts the linear scan sensor an additional distance to the required fly height of the linear scan sensor and takes over all flight functions. As the linear scan sensor is lifted past the set point of the pneumatic sensor/actuator, pressure inside the actuator decreases, automatically disengaging from flight functions. Once the voice coil actuator is engaged, the flight control apparatus operates at the required bandwidth to achieve quality images. In the event of a voice coil failure (for example, due to power failure, sensor failure, or electronics failure), the linear scan sensor falls toward the panel, and pressure builds in the pneumatic actuator, which automatically re-engages the linear scan sensor and takes over flight functions. Thus, the linear scan sensor is safely held at the pneumatic sensor/actuator set point.

In some embodiments, a flight control apparatus with a pneumatic sensor and a voice coil also includes a feedback control. Since the pneumatic sensor can accurately follow the contour without regard to the surface characteristics (for example, conductivity, reflectivity) an electronic sensor such as an optical displacement sensor 820 or height sensor circuitry embedded in the linear scan sensor itself may be used to detect changes in the fly height. The electronic sensor's output signal can then be fed to the voice coil which adjusts the fly height, thus completing the servo feedback loop. To ensure full coverage of the panel (areas with and without circuitry), in one embodiment an optical sensor may be used to maintain fly heights. In another embodiment, an embedded capacitive based height sensor may be used. In yet other embodiments, a combination of optical sensing and capacitive sensing may be used to sense the height and provide the feedback signal.

Setting and maintaining scan sensor fly height may be achieved using piezo actuation. The performance and control characteristics of a piezo stack are well known and a piezo actuator under ideal conditions can provide the required response and bandwidth to acquire data from the linear scan sensor. However, the physical size of a piezo actuator in comparison to its travel stroke is quite large. Accordingly, a relatively large piezo stack would be needed to provide the required range of motion for the linear scan sensor. For very long line scan sensors, for example, thirty or forty, shorter units joined and aligned to span the full width of the flat panel, the supporting structure would need to be particularly robust, and potentially bulky and heavy.

Figure 9:
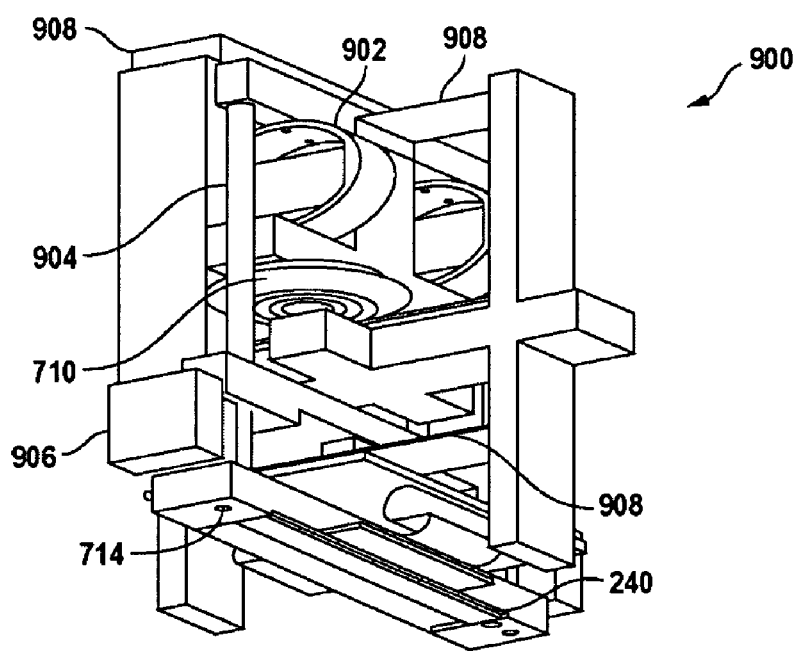
FIG. 9 is a perspective view of a hybrid pneumatic/piezo actuator flight control apparatus, in accordance with another embodiment of the present invention.

In accordance with another embodiment of the present invention, a flight control apparatus includes a pneumatic sensor and a piezo stack. FIG. 9 is a perspective view of a flight control apparatus 900, in accordance with another embodiment of the present invention. Embodiment 900 of the flight control apparatus is shown as including two pneumatic sensors 710, each having a corresponding piezo actuator 902 and a payload support rod 904 which attaches to one end of the linear scan sensor 240. The piezo actuators 902 are coupled to their respective pneumatic actuators 710, thus greatly reducing the required range of motion. At each end of the linear scan sensor assembly is a pneumatic sensor 714 and an optional optical displacement sensor. Alternatively, the linear scan sensor may have its own embedded height sensing circuitry. The flight control s 900 includes several flexures to constrain the motions in Z. The pneumatic sensor/actuator can accurately sense and follow the profile of the panel, independent of the panel surface properties, at the required fly height and provide a stiff, stable platform. Embodiment 900 of the flight control apparatus achieves the response time and bandwidth required to ensure attainment of quality images by the linear scan sensor. The overall package can be sufficiently compact and the array of scan sensors may be accommodated by a support beam that is feasible in both size and cost.

In some embodiments, a flight control apparatus with a pneumatic sensor and a piezo stack also includes a feedback control. Since the pneumatic sensor can accurately follow the contour without regard to the surface characteristics (for example, conductivity, reflectivity) an electronic sensor such as an optical displacement sensor 906 or height sensor circuitry embedded in the linear scan sensor itself may be used to detect changes in the fly height. The electronic sensor output signal can then be fed to the piezo actuator which adjusts the fly height, thus completing the servo feedback loop. To ensure full coverage of the panel (areas with and without circuitry), in one embodiment, an optical sensor may be used alone to maintain fly heights. In another embodiment, an optical sensor with an embedded capacitive based height sensor may be used. In yet other embodiments, a combination of optical sensing and capacitive sensing may be used to sense the height and provide the feedback signal.

The flat panel must be accurately aligned relative to the linear scan sensor, typically to within at least +/−50 micro radians (rotationally) and at least +/−175 microns (translation). The repeatability of the robot loading TFT glass on the chuck is typically +/−2 mm in either X and Y. Placement requirement of +/−5 mm allows for possible slippage of movement of the glass as it is placed by the robot onto the air cushion over the chuck. Typical maximum angular misplacement by the robot may be calculated as $\theta_{max}=\sin^{-1}(10/3200)$ or 3 milliradians. To meet the typical requirements for rotational or linear alignment, the method of aligning glass must be capable of correcting the glass plate rotationally from at least, for example, 3 milliradians to 50 microradians, and correcting it linearly from, for example, 5 mm to 0.35 mm.

Figure 10:
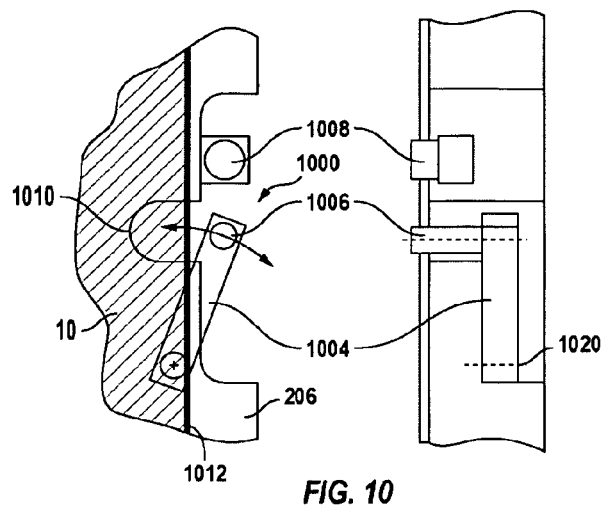
FIG. 10 shows a scrubber apparatus.

Glass plates are relatively very large in area (a few meters on a side) but are relatively very thin (0.5 mm to 1 mm). One method of aligning panels is using scrubbers, as shown in FIG. 10, to push on the panel edges to align the panel, as has often been used in previous generations of glass panels. A scrubber may include a rotating arm 1004 pivoting about an axis 1020, with a pin 1006 that extends in line or slightly above the top surface of the glass plate 10. The scrubber's motion may be driven pneumatically or by way of a motor (not shown). A fixed banking pin 1008 may be provided to ensure that the glass does not move beyond the reach of the scrubbers, which may be typically located along the four edges of the glass. To prevent panel breakage, side forces from the scrubbers may need to be applied gently, and therefore may need to move slowly to complete alignment of the panel, and therefore take more time than allowed by tact requirements. However, motion of the scrubbers may be controlled through use of servo motors to drive the scrubbers with ability to monitor and feedback on torque, or through use of visual feedback means as discussed below.

An alternative method to pushing or nudging the panel on its edges using scrubbers is to instead move the panel by grabbing one of its flat surfaces. The top surface of the panel contains TFT circuitry or other structures or features of interest for test or inspection which should not be touched, while the bottom surface of the panel can be physically contacted. Devices to grip the panel's bottom surface must pass through the supporting chuck. Typically, gripping is achieved through use of a vacuum pad to minimize adding contaminants to the substrate under test. There are numerous possible arrangements for placement of these through-chuck grippers to align the panel rotationally and linearly, such as also described in U.S. patent application Ser. No. 11/389,556. In one embodiment, two grippers are placed along a diagonal. In another embodiment, shown in FIG. 11, four grippers are place in a rectangular pattern. In FIG. 11, "M" refers to a "master" or driving unit, while "S" refers to "slave" or following unit.

Figure 11A:
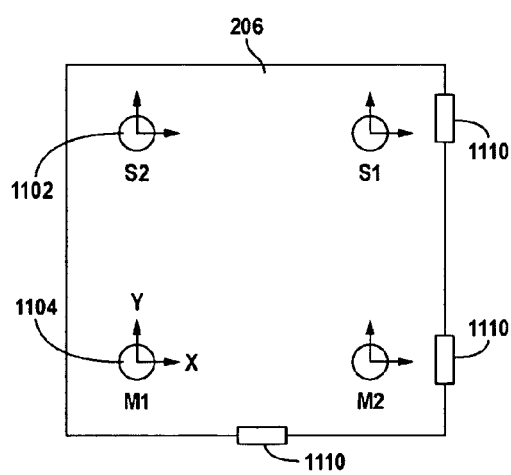
FIG. 11A is a top view of a through-chuck gripper with linear array sensors to read and provide feedback position for alignment.

The through-chuck gripper method or the scrubber alignment method may be used in combination with an edge detector such as the linear array sensor described in U.S. patent application Ser. No. 11/468,206, which may provide feedback on position to enable alignment by the grippers. FIG. 11A illustrates possible locations for three linear array sensors 1110. Linear array sensors may have pixel spacing of approximately 62.5 micrometers, and therefore, if the sensor resolution is +/−1 pixel, then a translation resolution of 125 micrometers and a rotational resolution of 37.5 microradians are possible. Thus, the edge detector linear array sensor may provide sufficient feedback to a through-chuck gripper assembly and meet the desired rotational and translational alignment specifications.

Figure 11B:
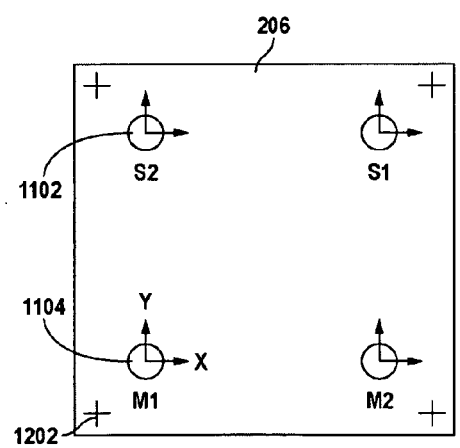
FIG. 11B is a top view of a through-chuck gripper with fiducial marks for an imaging system to read and provide feedback position for alignment.

The through-chuck gripper assembly or the scrubber alignment method may also be used in combination with an imaging system to feedback the position and alignment of the panel. As shown in FIG. 11B, TFT glass substrates have alignment fiducial marks 1202 etched on each corner and at the corner of each panel. The glass substrate fiducial marks may be detected using an imaging system with sufficient field of view to detect movement of the panel. Two imaging sensors may be located at opposing corners of glass to measure a translational and rotational feedback error to the gripper control systems.

Electrical signals are often applied to a panel under test using a probe head. The probe head is lowered to make contact to the panel, usually at one end or one side of the panel, to apply an electrical test signal while the test or sensor head is simultaneously stepped or scanned across the same panel. Because the probe pads on the panel are located very close to the active area, the test head and the probe head must not intersect during testing. The probe head must physically contact the pads on the panel, and the test head must be very close to, but not touching, the panel active area. The distance from active area to probe pads can be as little as 5 mm. One known solution uses cantilevered beams on the probe head to allow the probes to physically contact the pads while keeping the stiff and bulky portion of the probe bar removed from physical interference. In some cases, the test head may be cause to jump over a probe beam to move to the next site, or alternatively, the probe beam may be first moved out of the way while the test head is moved and then return to the probing position.

The overall throughput of panels through the test system must be as high as possible. For cases where the test head and probe head can work together without collision, there is often an impact on overall throughput due to the finite times required to move each into a position for testing. This sequencing time is overhead and undesirable for a production machine. Thus, the combination of the very close proximity between the sensor head and the probe head, the requirement for reliable contact of the probe head to the panel to be tested, and the requirement for high throughput for panel testing are challenges that a continuous scanning system of the present invention is adapted to overcome.

Step and settle sensor/test heads dwell in one position to collect a two-dimensional image and then step to the next location, while a linear sensor/test head that scans continuously requires that probing be compatible with continual scanning. In the case of a continuous scanning system, raising the test head and then moving it over the probe would interrupt normal test flow of the machine and result in lost time. Alternatively, if the linear test sensor continued to move and the probe head were momentarily lifted and moved out of the way of the scanning head, the panel would lose drive signal for that interval of time, and no test data could be collected.

Figure 12:
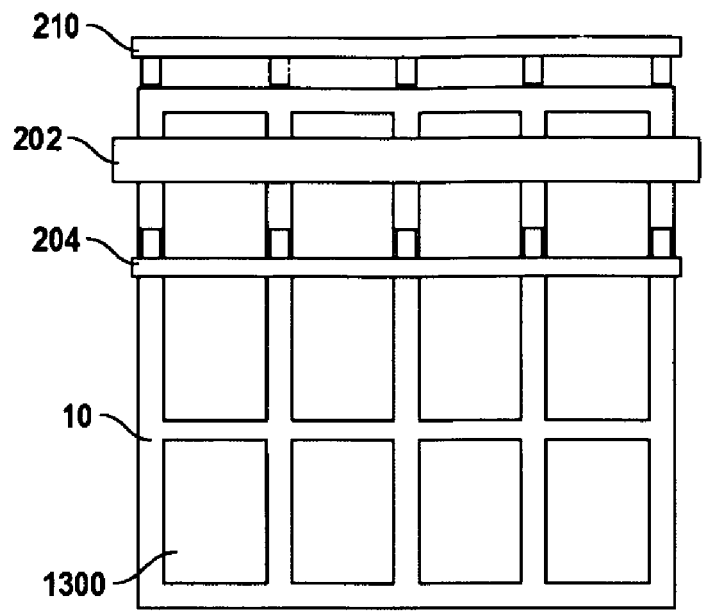
FIGS. 12 and 13 are top views of the probe bars and sensor head of the continuous linear scanning system of FIG. 2, in accordance with one embodiment of the present invention.
Figure 13:
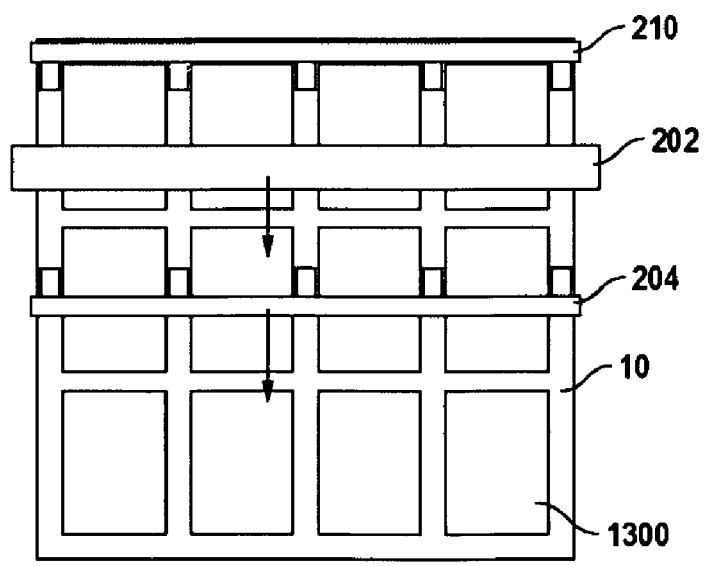
Figure 14:
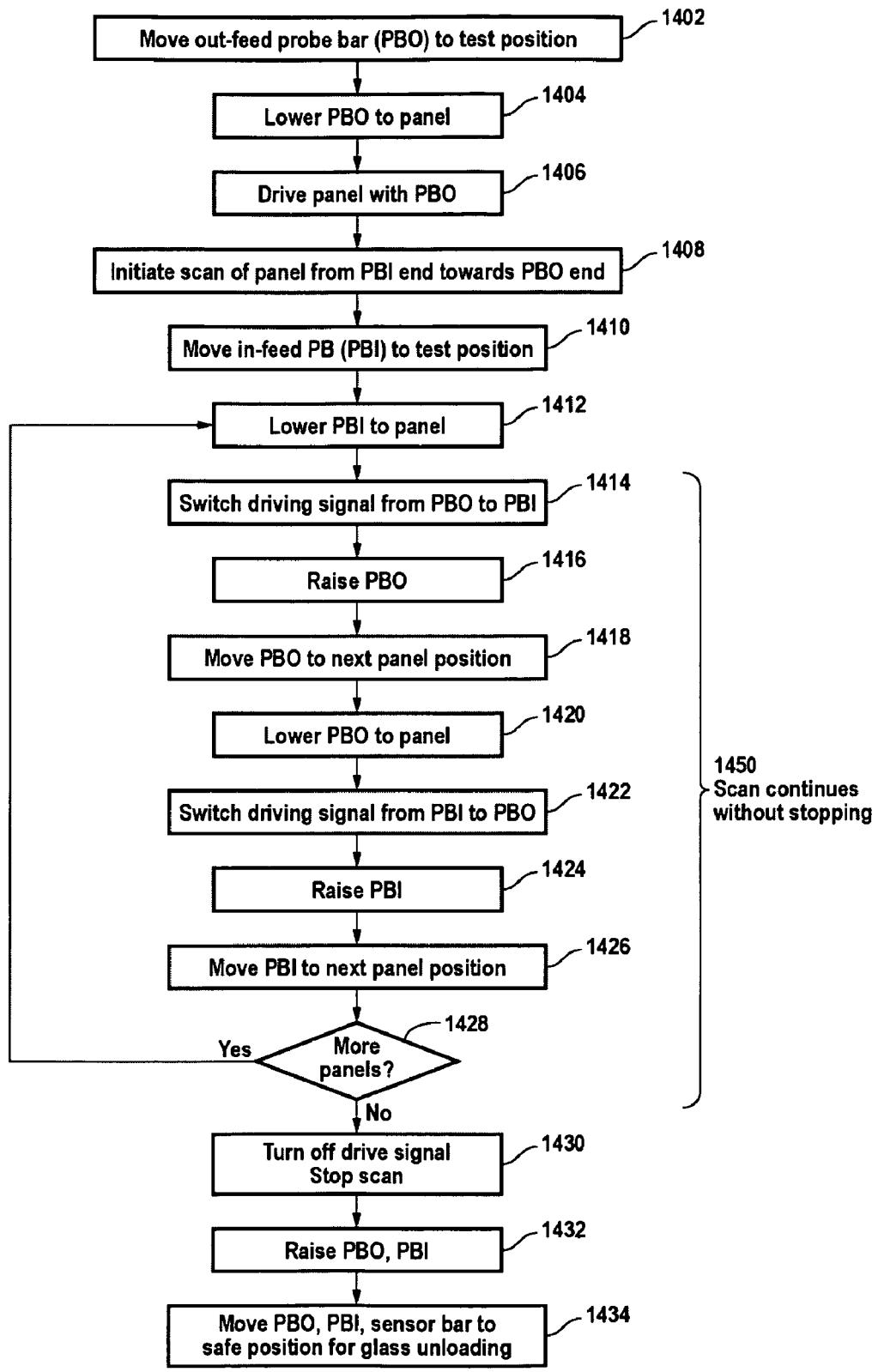
FIG. 14 is a flowchart of steps used for continuously applying test signals to a flat panel tested with continuous linear scanning system of FIG. 2.

The present invention overcomes many of the constraints on physical design and throughput that are present with a single bar doing the same task. The invention provides a different sequence of operations and uses a multitude of gantries each carrying a different probe bar or a sensor head, although the exemplary embodiment of FIGS. 12 and 13 is shown as using two gantries 204 and 210, respectively carrying probe bars 260 and 250, and a gantry 202 carrying sensor head 240. In FIG. 13, the position of gantry 202 is shown as having being moved relative to gantries 204 and 210 as compared to FIG. 12. Referring concurrently to FIGS. 2, 13, and 14 gantries 204 and 210 span the width of the system and ride along rails 232 and 234, and linear sensor head 202 also spans the width of the system and rides along rails 230. The glass substrate 10 has panels 1300.

FIG. 14 is a flowchart of steps used to operate probe bars 260, 250 and sensor head 240. At the start 1402, in-feed probe bar (PBI) 210 is not connected to the glass 10, while out-feed probe bar (PBO) 204 is in position at the out-feed end of the first row of panels 1300. The PBO is lowered onto the panel (Step 1404) and electrical drive is applied (Step 1406). The linear sensor head 202 begins to scan the first row of panels (Step 1408). When the linear sensor head is far enough away from the PBI 210, the PBI moves into position and is lowered to the panel (Steps 1410 and 1412). During a refresh time period of data collection, the responsibility for application of the drive signal is exchanged from the PBO to PBI (Step 1414). The linear sensor head 202 continues to scan during this exchange. The PBO detaches from the panel and moves in the out-feed direction towards the next panel's out-feed end and drops and attaches to the next panel (Steps 1416 to 1420). The linear sensor head 202 continues to scan during this PBO activity. Just before the linear sensor head reaches this next panel, the responsibility for the driving signal is changed from the PBI to the PBO (Step 1422). The linear sensor head continues onto this next panel, now energized by the PBO. The PBI rises, and moves to its next position (Steps 1424 to 1426), and the process of shifting between PBO and PBI continues until the full glass plate is scanned. When the processing of the plate is completed, the PBO, PBI each rise to be clear of the plate, and then the PBO, PBI and linear sensor head each move to their respective safe positions so that the plate may be unloaded (Steps 1430 to 1434).

Successful implementation of the sequence of FIG. 14 requires the panel to be designed with redundant shorting bar pads allowing the entire panel to be driven by either the in-feed or out-feed side pads. Further, the system design requires that each probe bar (head) be capable of driving a pattern on the full panel and the drive electronics support dynamic switching of control between the two probe heads. This switch of control may normally be completed within the refresh time of a panel when no measurement is being performed.

The above sequence and arrangement of probe bars and sensor/test heads permits continuous scan testing with a test signal driven into the panel at all times. Each probe head sequentially hands off panel driving to the other over the entire panel. This allows a scanning test head to have maximum throughput, because the head never has to wait for probe head re-positioning.

The present invention also provides flexibility in pad placement relative to the active area of the panel. Because the sensor/test head does not come in close proximity to the driving probe head, there is a relatively large area around the edge of the panel rows and columns that can include the probe pads without impacting physical envelope or throughput.

Figure 15:
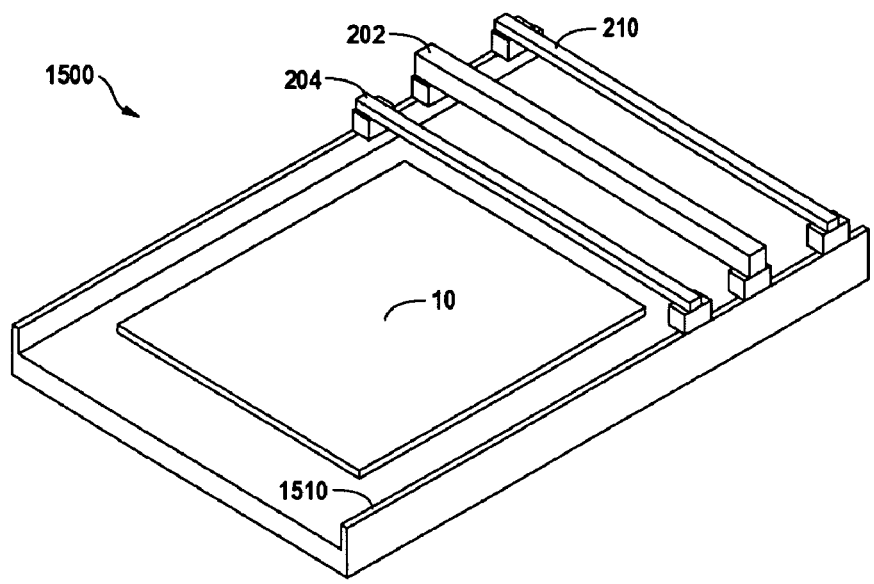
FIG. 15 is a simplified perspective view of a scanning system that includes three gantries sharing the same encoder and track.

A hardware embodiment that supports the above sequence of probe bars and linear sensor/test head in a continuous scanning system may include three gantries, indicated as 202, 204, and 210 in FIGS. 2 and 15. Front gantry 204 carries the front probe bar 260, the middle gantry 202 carries the linear sensor/test head imaging devices 240, and the rear gantry 210 carries the rear probe bar 250. In one embodiment each gantry has an associated magnet track, also referred to herein as rail, indicated as 230, 232, and 234 in FIG. 2, and an encoder scale. In another embodiment 1500 as shown in FIG. 15, all three gantries 204, 202 and 210 share the same magnet track 1510 and encoder scale to save cost. In the embodiment shown in FIG. 15, the front and rear of the stage have slightly extra length to park the gantries during load and unload of the panel. The configuration of FIG. 15 is suitable for use with conveyor load and unload operations for inline applications.

The present invention includes a gantry cross-beam for the linear sensor that has sufficient stiffness and minimum sag. The width of the cross beam (along the X direction) is determined by the distance at the ends of the gantry required to clear glass substrates during load and unload operations by the robot and which is required to clear probe bar axes.

To achieve the shortest system length in the Y-direction, and therefore the smallest footprint, while still enabling the robot arm effectors to place and remove the glass from the chuck, the sensor gantry and/or probe bar gantries are adapted to also move in the Z direction. The present invention provides a sinking probe bar, which is illustrated in FIG. 2, and in more detail in FIGS. 16A and 16B. Accordingly, the probe bars 250 and 210 are designed so as to travel toward the front or toward the back of the system 200, and then to drop in the Z direction below the chuck 206 and glass 10 when necessary. In particular, the probe bars 250 and 260 may drop to allow the sensor gantry 202 to continue travel to cover entire chuck and park directly above the probe bar axes.

Figure 16A:
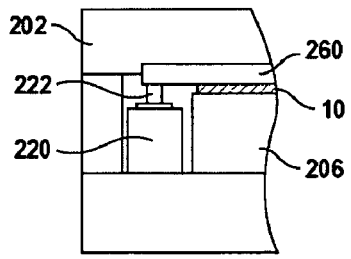
FIGS. 16A and 16B are cross sectional and top views of the gantry carrying the sinking probe bar in the up-position and at the same level as the gantry carrying the array of linear sensors.
Figure 16C:
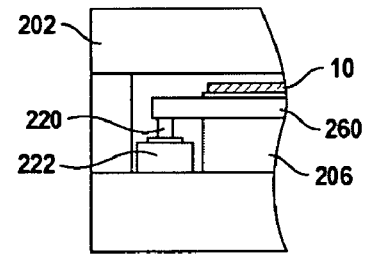
FIGS. 16C and 16D are cross sectional and top views of the gantry carrying the sinking probe bar in the down-position below the level of the gantry carrying the array of linear sensors.
Figure 16B:
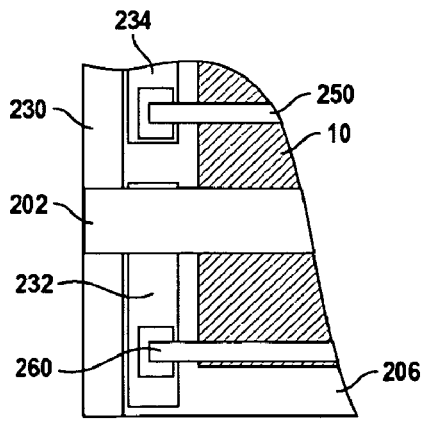
Figure 16D:
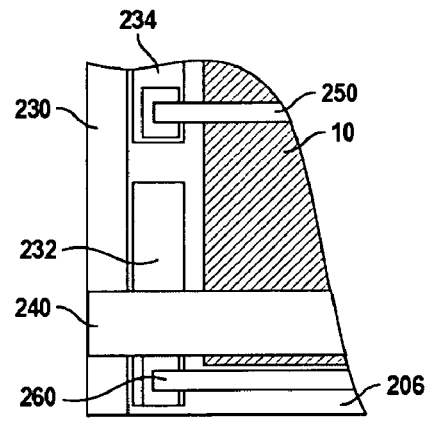

FIG. 16A is a side view of a portion of system 200 showing a sinking probe bar in the up position relative to chuck 206 and at the same level as the sensor gantry. FIG. 16B is a top view of system 200 corresponding to side view 16A. FIG. 16C is a side view of a portion of system 200 showing a sinking probe bar in the down position relative to chuck 206 with sensor gantry passing over the probe bar. FIG. 16D is a top view of system 200 corresponding to side view 16C.

Referring to FIGS. 16A and 16C, the continuous linear scanning system of the present invention is shown as including two air cylinders stacked on top of each other at the ends of the probe bar gantry. The upper air cylinder 222 in the sinking probe bar has small stroke, and moves up and down to scrub or contact the pads on glass substrates to align panels for defect detection. The bottom air cylinder 220 has an extended stroke that moves the probe bar 260 up and down, and in particular, can move it below the chuck 206 to allow the robot end-effector (not shown) which carries the glass 10 into and out of the system to pass above the front probe bar. The air cylinders are thus adapted to move and then parking the probe bars 260 and 250 to avoid having them sit side-by-side, thereby resulting in the shortest length of stage in the Y-direction.

Figure 17:
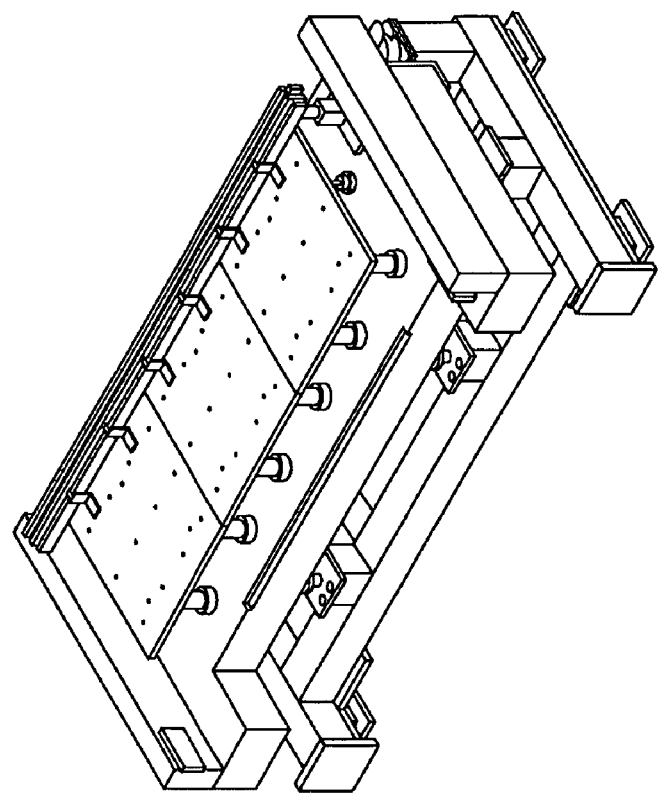
FIG. 17 shows an exemplary multi-piece gantry stage.
Figure 17:
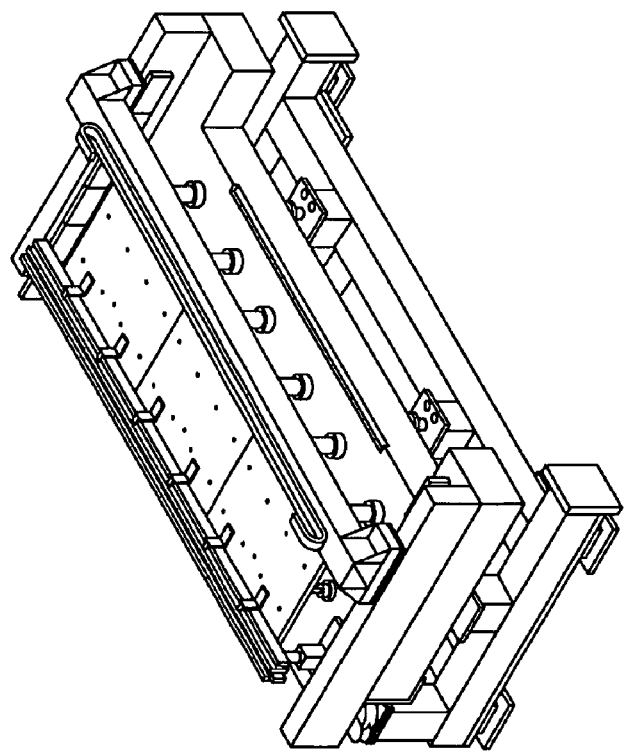

The external dimensions of a Generation 10 continuous scan system are expected to be approximately 4 meters by 4 meters. This footprint exceeds the largest size shipping container that can fit in the cargo of the largest airplanes (for example, Boeing 747). Therefore, to fit the shipment container the gantry stage must be divided into at least two sections. One embodiment is illustrated in FIG. 17. In this example, the front section may include the lower frame and base 208, a third of the chuck 206, the front probe bar gantry 204 and sensor gantry 202. The rear section may include the lower frame and base 208, a third of the chuck 206 and rear probe bar gantry 210. The two sections can include registration pins and holes to facilitate clocking and alignment of the parts during assembly at the customer's site. Each of these two modular sections could fit into the cargo space of a Boeing 747 cargo airplane. FIG. 17 illustrates a granite based system. A steel frame based system may also be divided into modular sections for shipping purposes.

For detection of amorphous silicon and other photosensitive panel defects, front surface illumination may be provided. Alternatively, the chuck may be made of a transparent material such as glass, and illumination may be provided through the back surface. In either case, the present invention may be configured to observe and/or test photosensitive defects such as amorphous silicon that change in resistivity when exposed to light (short wavelengths, for example, 470 nm), and when a driving voltage is applied will result in a contrasting signal compared to when the light is off.

The sensor-carrying gantry may be provided with inspection cameras such as a defect review camera (DRC), an optical camera reader (OCR), and/or an alignment optical system camera (AOS) and thus result in a non-contacting scanning test system that includes a linear scan capacitive sensor assembly with integrated optical inspection capabilities. Alternatively, the scanning sensor may be an optical sensor having a given resolution, and the additional inspection cameras may be of higher resolution and used for review. Another embodiment may combine the non-contacting linear capacitive sensor with a linear optical sensor on the same or different gantries on the scanning system.

The above embodiments of the present invention are illustrative and not limiting. Various alternatives and equivalents are possible. The present invention is applicable to high throughput testing of plates of TFT/LCD panels, OLED-based TFT panels, solar cell panels, and any other flat media. Other additions, subtractions or modifications are obvious in view of the present disclosure and are intended to fall within the scope of the appended claims.

What is claimed is:

1. A system adapted to perform a continuous full linear scan of a flat media, the apparatus comprising:
 a chuck adapted to support the flat media;
 a first gantry comprising at least one linear array of non-contacting sensors spanning the width of the flat media and adapted to move across an entire length of the flat media;
 a second gantry comprising a first probe head spanning a width of the flat media and adapted to apply a first electrical signal to the flat media, said first probe head being further adapted to move along a direction substantially perpendicular to the surface of the flat media while the first gantry is in motion;
 a third gantry comprising a second probe head spanning the width of the flat media and adapted to apply a second electrical signal to the flat media, said second probe head being further adapted to move along the direction substantially perpendicular to the surface of the flat media while the first gantry is in motion.

2. The system of claim 1 further comprising a flight control apparatus comprising, said flight control apparatus comprising:
 an actuator; and
 a feedback control circuit operation in communication with the actuator and adapted to maintain a distance separating the linear array of non-contacting sensors and the flat media to within a predefined range.

3. The system of claim 2 wherein said actuator comprises at least one pneumatic actuator.

4. The system of claim 3 wherein said actuator further comprises at least one voice coil.

5. The system of claim 3 wherein said actuator further comprises at least one piezo electric actuator.

6. The system of claim 2 wherein said feedback control circuit is integrated with the at least one linear array of non-contacting sensors.

7. The system of claim 1 further comprising a control circuit adapted to control movements of the first and second gantries so as to enable continuous scanning of the flat media while a test signal is applied continuously to the flat media.

8. The system of claim 1 wherein said at least one linear array of non-contacting sensors comprises an assembly of linear sensors coupled and aligned to one another so as to span the full width of the flat media.

9. The system of claim 1 wherein said first gantry further comprises a second linear array of non-contacting sensors spanning the width of the flat media.

10. The system of claim 9 wherein said second linear array of non-contacting sensors comprises an assembly of linear sensors coupled and aligned to one another so as to span the full width of the flat media.

11. The apparatus of claim 1 further comprising:

a first cylinder having a first stroke and adapted to move a plurality of probes positioned on the first probe head into and out of contacts with a plurality of pads positioned on the flat media; and a second cylinder having a second stroke greater than the first stroke and adapted to move the first probe head below a top surface of the chuck.

12. A method of performing a continuous full linear scan of a flat media, the method comprising:

supporting the flat media during the full linear scan;

enabling a first gantry to move across an entire length of the flat media, said first gantry comprising at least one linear array of non-contacting sensors spanning the width of the flat media;

enabling a second gantry comprising a first probe head to move along a direction substantially perpendicular to the surface of the flat media while the first gantry is in motion, said first probe spanning the width of the flat media and adapted to apply a first electrical signal to the flat media; and enabling a third gantry comprising a second probe head to move along a direction substantially perpendicular to the surface of the flat media while the first gantry is in motion, said second probe spanning the width of the flat media and adapted to apply a first electrical signal to the flat media.

13. The method of claim 12 further comprising:

maintain a distance between the linear array of non-contacting sensors and the flat media to within a predefined range.

14. The method of claim 13 further comprising:

maintaining a distance between the linear array of non-contacting sensors and the flat media to within a predefined range using at least one actuator.

15. The method of claim 14 further comprising:

maintaining a distance between the linear array of non-contacting sensors and the flat media to within a predefined range using at least one actuator and at least one voice coil.

16. The method of claim 14 further comprising:

maintaining a distance between the linear array of non-contacting sensors and the flat media to within a predefined range using at least one actuator and at least one piezo electric device.

17. The method of claim 13 further comprising:

integrating a feedback control circuit with the at least one linear array of non-contacting sensors, said feedback control circuit adapted to maintain the distance between the linear array of non-contacting sensors and the flat media to within the predefined range.

18. The method of claim 12 further comprising:

controlling movements of the first and second gantries so as to enable continuous scanning of the flat media while a test signal is continuously applied continuously to the flat media.

19. The method of claim 12 wherein said at least one linear array of non-contacting sensors comprises an assembly of linear sensors coupled and aligned to one another so as to span the full width of the flat media.

20. The method of claim 12 wherein said first gantry further comprises a second linear array of non-contacting sensors spanning the width of the flat media.

21. The method of claim 12 wherein said second linear array of non-contacting sensors comprises an assembly of linear sensors coupled and aligned to one another so as to span the full width of the flat media.

22. The method of claim 12 further comprising:

moving a plurality of probes positioned on the first probe head into and out of contacts with a plurality of pads positioned on the flat media; and moving the first probe head to a position below a top surface of the chuck.

* * * * *